United States Patent

Wood et al.

[11] Patent Number: 6,074,581
[45] Date of Patent: Jun. 13, 2000

[54] PRILLING BY INTRODUCTION OF A MOLTEN LIQUID INTO A CARRIER LIQUID

[75] Inventors: Stanley E. Wood; Robert A Weinhardt, both of Ridgecrest, Calif.

[73] Assignee: The United States of America as represented by the Secretary of the Navy, Washington, D.C.

[21] Appl. No.: 09/140,062

[22] Filed: Aug. 24, 1998

[51] Int. Cl.[7] .................................................... B29B 9/10
[52] U.S. Cl. .................................... 264/14; 264/5; 264/9
[58] Field of Search ........................................ 264/5, 9, 14

[56] References Cited

U.S. PATENT DOCUMENTS 3,207,818  9/1965  Marshall .................................... 264/14
4,783,217  11/1988  Robertson .................................. 264/14

*Primary Examiner*—Mary Lynn Theisen
*Attorney, Agent, or Firm*—David S. Kalmbaugh

[57] ABSTRACT

Prills are prepared by melting a salt and introducing the molten salt into a carrier liquid. Oxidizing salts of ammonia, ammonium nitrate (AN) and ammonium dinitramide (ADN) are melted with a stabilizer and introduced by dry nitrogen pressure into an inert, perfluorinated carrier liquid of greater specific gravity than the molten salts. In a first embodiment, the carrier liquid is quiescent and below the salt solidification temperature so that prills solidify from drops of the salt rising through a column which substantially retains the liquid. In a second and continuous embodiment, the carrier liquid is initially above the solidification temperature, and the salt is injected into the moving liquid which passes with the molten salt in turbulent flow through a heated conduit, in which stationary vanes disperse the salt into droplets, and then through a cooled conduit for solidification of the salt into prills without agglomeration. In the both embodiments, the prills may be separated from the liquid by flotation and any liquid carried with the prills recycled. In the continuous embodiment, the main flow of carrier liquid is pumped through a preheater and then back to the molten salt injector.

20 Claims, 2 Drawing Sheets

PRILLING BY INTRODUCTION OF A MOLTEN LIQUID INTO A CARRIER LIQUID

BACKGROUND OF THE INVENTION

1. Field of the Invention

The present invention pertains to a method for direct preparation of solid nonmetallic particulates by liquid comminuting from molten material introduced into another liquid which may be moving, the method being particularly useful with oxidizing salts of ammonia.

2. Description of the Prior Art

Prills or small, solid spherical particles are used for a variety of purposes as for application of fertilizers and for inclusion of oxidizing materials such as ammonium dinitramide (ADN) or ammonium nitrate (AN) in energetic compositions. In the prior art, prills are made by spraying molten material through a number of nozzles to form droplets and allowing the droplets to fall through a column of air or liquid until they cool sufficiently to solidify and can withstand impacting the bottom of the column without distortion or damage.

This method has a number of deficiencies For one, the height of such cooling columns using air typically ranges from 20 or 30 feet to nearly 100 feet in height which is not a function of volume of production and thus cannot be scaled down for low volume or laboratory production. For another, precise control of prill sizes, particularly in small sizes such as the about 50 microns desirable with oxidizing materials, is not possible. Further, precise control of the cooling rate is not possible so that the product has irregular crystallization or fractures caused by either too slow or too rapid a cooling rate. Also, impacts of droplets or incompletely hardened particles with other droplets, particles, or column sides results in a product with indentations and other irregularities. Similar problems occur in cooling droplets in liquid which boils or otherwise changes phase or releases gas on contact with the molten droplets.

Further, this method is dangerous with an energetic material such as the oxidizing salts of ammonia, ADN and AN, since a relatively large quantity of the material is melted together, as in a pan with a liquid level providing sufficient head for spraying, and the hazard of fire or violent reaction increases with temperature and volume of material. A fire or violent reaction may, of course, propagate from the heated material to cooler material awaiting melting or already prilled. The dangers of prior art prilling methods and apparatus are particularly serious with ADN which is extremely sensitive although having a nominal freezing and melting temperature of about 93° C. substantially below that of AN where this temperature is about 175° C. In a conventional prilling tower, where hot droplets or particles may contact causing ignition or violent reaction which may then propagate, the sensitivity of ADN, which detonates in small amounts, could be disastrous. Therefore, the use of ADN has been limited by its unavailability in small, regular particles of uniform size since grinding of this material even when cool, unlike AN, is also likely to result in fire or violent reaction.

Even in the absence of such reactions, ADN is also difficult to handle, for prilling or other purposes, because molten ADN is highly corrosive to all metals. Also, ADN can supercool as much as 70° C. between the molten and solid states, thus requiring the removal of large quantities of heat to insure solidification of prills. Even if it were safe to prill ADN in air columns, this supercooling property would require large and expensive columns.

Insofar as known to applicants, prilling of ADN in liquid filled columns has not heretofore been attempted since ADN is highly soluble in water and hot ADN presents a significant safely hazard with oxidizable materials such as mineral oils.

Other problems involve the need for prills to include stabilizers to prevent decomposition or crystalline phase change and to eliminate moisture even when in the unprocessed material to be prilled. It is apparent that prilling in an air column introduces atmospheric moisture; also, certain stabilizers are formed by water releasing chemical reactions.

SUMMARY OF THE INVENTION

Accordingly, an object of the present invention is to provide methods for the production of prills in any quantity and in a relatively small space.

Another object is to provide for the production of prills uncontaminated by exposure to air, water, or other chemically reactive materials.

A further object is to provide prills which are without surface irregularities or internal imperfections and which may have a selected size.

Yet another object is to provide for the production of prills by methods effective with materials which are corrosive when molten or which supercool on solidification.

A specific object is to safely provide prills of sensitive and energetic materials by minimizing the amount of heated or molten material present, by isolating such material from the bulk of the energetic material in the apparatus, by eliminating impacts with prills being formed, and by eliminating the propagation of reactions between prills being formed.

Another specific object is to safely provide prills of ammonium dinitramide which may have a selected size in a range of 20–350 microns.

An additional object is to provide for the convenient introduction of stabilizers into material to be prilled.

A particular object is to provide methods meeting the above objects by the use of carrier fluids which are inert, which support and form droplets of molten material being solidified into prills, and which do not change phase on contact with the molten material.

Another particular object is to produce prills by the use of such carrier fluids which do not solidify, boil, or become excessively viscous at the temperatures involved in prilling.

A further particular object is to produce prills by the use of such carrier fluids which have suitable densities and viscosities for prilling involving highly turbulent flow and for prilling involving flotation.

An ultimate object is to provide methods which have the above and other advantages, which are economical by the recycling of heat and such carrier fluid, and which are fully effective.

These and other objects and advantages are achieved by methods in which a material to be prilled is melted and the molten material introduced into a carrier liquid which supports and forms droplets of the molten material. The method is particularly adapted to the oxidizing salts of ammonia, ammonium nitrate and ammonium dinitramide, which are melted with a stabilizer and introduced by dry nitrogen pressure into an inert, perfluorinated carrier liquid of greater specific gravity than the molten salts.

In one method embodying the present invention, this carrier liquid is quiescent and below the prill material solidification temperature so that prills solidify from drops of the material rising through a column which substantially retains the carrier liquid.

In another and continuous embodiment, the carrier liquid is initially above the solidification temperature; and the material to be prilled is injected into the moving carrier liquid which passes with the molten material in turbulent flow through a heated conduit, in which stationary vanes disperse the molten material into droplets, and then through a cooled conduit for solidification of the material into prills without agglomeration. The size of the prills may be selected precisely, as within a range of 20–350 microns, by controlling the rate of flow of the carrier liquid and thus the turbulence which disperses the droplets.

In both embodiments, the prills may be separated from the carrier liquid by flotation with any liquid carried with the prills being recycled. In the continuous embodiment and after separating the prills, the main flow of carrier liquid is pumped through a heater and then back to the molten material injector. Also in the continuous embodiment, the cooled conduit may be cooled with compression refrigeration with the evaporated refrigerant passing in parallel flow along the conduit and with the compressed refrigerant passing, for heat regeneration, to a carrier liquid preheater before condensation. For ammonium nitrate, a metal amine complex serving as a phase stabilizer may be formed by melting another salt with the ammonium nitrate and subjecting the meltage to ammonia gas.

BRIEF DESCRIPTION OF THE SEVERAL VIEWS OF THE DRAWING

The above and other objects, advantages, and novel features of the present invention will be apparent from the following detailed description when considered with the accompanying drawings in which.

DETAILED DESCRIPTION OF THE INVENTION

First Embodiment

Figure 1:
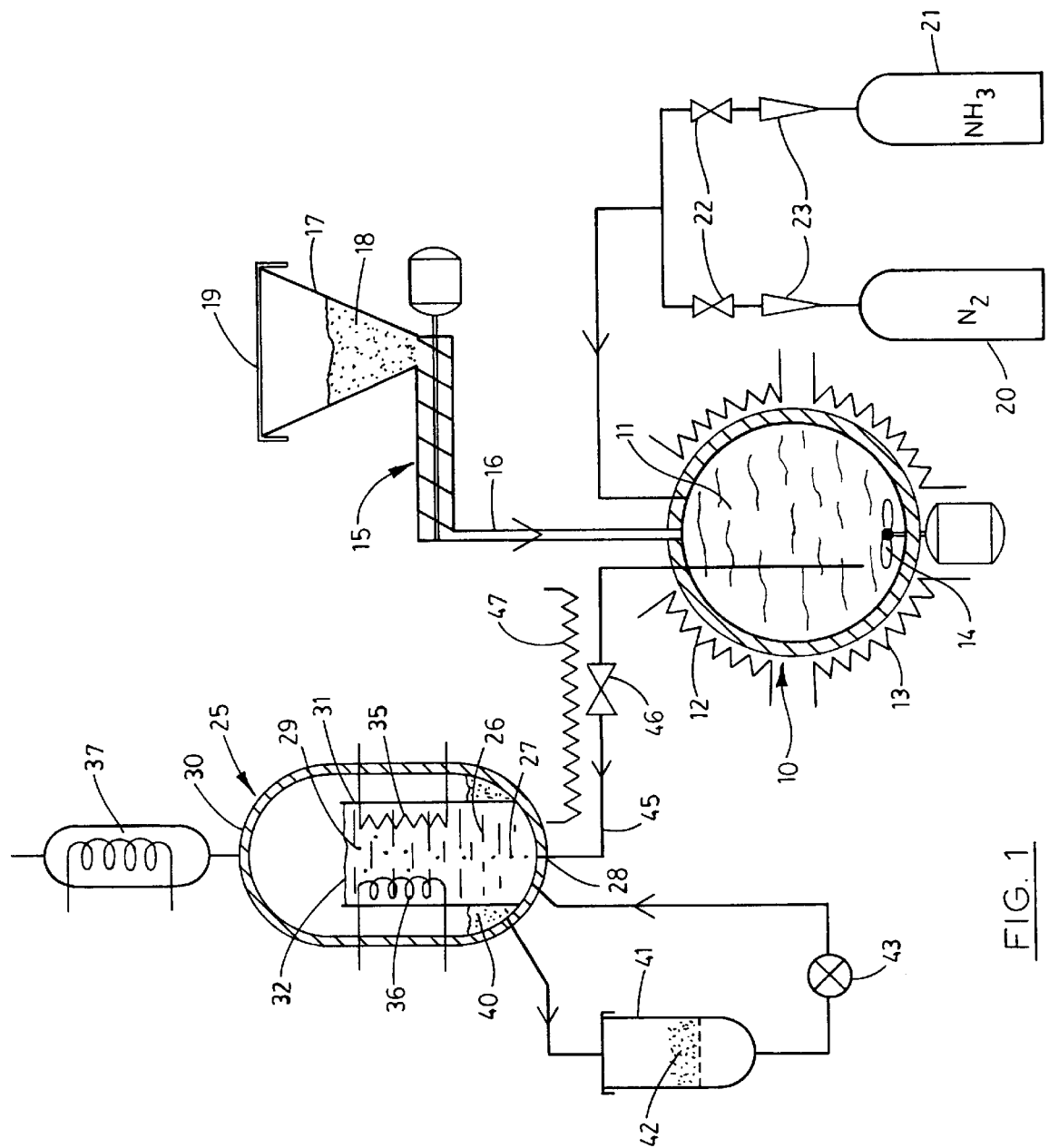
FIG. 1 is a diagram of equipment for practicing a first method of the present invention for prilling by introduction of molten liquid into a carrier liquid.

Referring more particularly to the drawings, in FIG. 1 is shown equipment for practicing a first method embodying the present invention for prilling by introduction of a molten liquid into a carrier liquid is embodiment is particularly effective for forming ammonium nitrate prills of about ⅛ inch diameter from ammonium nitrate (AN) which has a melting and freezing temperature of about 170 to 175° C. The equipment is constructed of any materials which are chemically inert to the material being processed to avoid any chemical reaction or any contamination of the product. The equipment and the method protect the processed material from exposure to the atmosphere or to moisture.

The equipment includes a melting and reaction vessel 10 for AN material 11 to be melted therein. This material is heated by well-known electric resistance heaters 12 and 13 which provide independent control of the temperature of the upper and lower portions of the vessel so to maintain the melted material at about 180° C. for carrying out the present method as described below. When melted, the material is stirred by a magnetic stirrer 14.

Material to be melted is supplied to vessel 10 in any suitable manner, such as a screw feeder 15 connected to the vessel by a conduit 16. The feeder has a hopper 17 for pulverized, dry, raw material 18. The hopper is, selectively, loosely or tightly closeable by a cover 19.

Vessel 10 is connected to a source 20 of dry, pressurized nitrogen gas and to a source 21 of ammonia gas. The flow of these gases and their pressure in the vessel are controlled using a valve 22 and a flow meter 23 individual to each gas source.

The equipment has a prilling column 25 containing a carrier and heat transfer liquid 26. This liquid is of greater specific gravity than the molten AN material and so supports and forms droplets 27 of the material introduced into the column and directly into the liquid through an orifice which is at the bottom of the column and is indicated by numeral 28. The droplets rise through the liquid which removes the heat of fusion from the droplets so that they solidify into the desired solid spherical prills 29.

The liquid 26 must be inert both to the melted material of the droplets 27 and to solid material of the prills 29. In order that the prilling column 25 be small and low in height in comparison to the before mentioned prior art columns, the liquid should have a high thermal conductivity and should also have a density close to that of molten AN so that the droplets float slowly upwardly in the column. Also the liquid must provide an environment surrounding each droplet that provides prills without indentations or irregularities. This requires a liquid that does not change phase or produce gas bubbles on contact with the droplets. The liquid must also not become excessively viscous or solidify at the lowest temperature within the column.

For prilling in accordance with the present invention, suitable, perfluorinated liquids are sold under the tradename "Fluorinert" by the 3M Specialty Chemical Division of St. Paul, Minn. These liquids are stated to have a viscosity equivalent to water and a thermal expansion eight times that of water. For prilling AN, the particular such liquid identified as "FC-43" has been found effective. This particular liquid is believed to be a tributyl amine and is cataloged as having a typical boiling point of about 174° C.; and a pour point—sometimes referred to herein as "fluid temperature"—of −50° C. It is evident that this perfluorinated liquid has a boiling temperature slightly greater than the freezing temperature of AN, and flows at a fluid temperature less than this freezing temperature. The density of the FC-43 liquid is catalogued as about 1.88 G/cm$^3$ at 25° C. while the density of both solid and molten AN at temperatures of immediate interest is in the range of 1.6–1.8 G/cm$^3$.

Prilling column 25 has an enclosing outer wall 30 and an upwardly open inner cylinder 31 whose top edge establishes a surface 32 for a quantity of the carrier liquid 26 in a generally quiescent condition. Within cylinder 31 are any suitable heating and cooling elements, represented as a resistance heater 35 and a cooling coil 36, which maintain this quantity of the liquid at a temperature between the freezing temperature of the AN and the fluid temperature of the liquid. With AN and the FC-43 liquid, such a temperature of 174° C. has been found effective. The top of the column 25 is vented through a condenser 37 which returns any vapors of the carrier liquid to the column.

As prills 29 reach liquid surface 32, the prills float over the edge of cylinder 31 and collect around the bottom of the cylinder, together with any of the liquid 26 which carries over, in a region indicated by numeral 40. The prills and such liquid pass from this region to a filter 41 which retains the produced prills as indicated by numeral 42 while the overflow liquid is returned to the bottom of the column by a pump 43 thereby separating the prills from the carrier fluid. Any carrier liquid remaining on the product may be removed by vacuum distillation and recycled into column 25.

Melted material 11 is provided to orifice 28 from vessel 10 by a conduit 45 having a flow control valve 46. The valve together with the conduit and its contents are maintained at about 180° C. by a resistance heater 47 extending along the conduit.

To produce a batch of product prills 42 by operation of the equipment shown in FIG. 1, the heaters 12, 13, 35, and 47 are energized; valve 46 is closed; and a suitable charge of ammonium nitrate is provided as the material 18 and fed into the vessel 10 by feeder 15. When this charge is melted, stirrer 14 is activated, and nitrogen gas from source 20 thereof is provided to vessel 10 and vented by way of conduit 16 and hopper cover 19 to purge moisture from the charge.

In accordance with the present invention, a metal amine complex phase stabilizer which does not produce water by reaction with ammonium nitrate may be advantageously incorporated in the prills 42. This is done by feeding an appropriate amount of a metal amine salt, specifically zinc diamine sulfate, from hopper 17 into vessel 10 and introducing ammonia gas from source 21 thereof into the vessel while heating and stirring continue until reaction is complete and a homogeneous solution is formed as may be determined by viewing the material 11 through a suitable window, not shown, in the vessel. A method is thus provided to incorporate a solid, meltable stabilizing substance in the prills by providing the stabilizing substance in the melted material 11 before introducing the resulting the resulting meltage into column 25 and carrier liquid 26.

When the meltage is ready, the flow of ammonia gas from source 21 thereof is stopped, and nitrogen gas from source 20 thereof is restarted to pressurize vessel 10. Valve 46 is adjusted so that this pressurization provides a suitable flow rate of melted material 11 into prilling column 25 through orifice 28 at the lower portion of the column 25. Droplets 27 of the melted material are thereby introduced into the quantity of the carrier liquid 26 within inner cylinder 31. Since it is evident that the droplet size corresponds to the desired product prill size, the size of the droplets and thus the size of the prills are selected by the size of the orifice and by the flow rate therethrough as controlled by the nitrogen pressure in vessel 10 and by valve 46.

As droplets 27 of melted AN float toward surface 32 from orifice 28 due to the slight density difference between the two fluids, prills 29 form from the droplets by heat transfer to perfluorinated carrier liquid 26 so that the droplets cool in the liquid to a temperature between the freezing temperature of the AN and the above-identified fluid temperature of the liquid.

As heat is absorbed from droplets 27, this heat is removed by cooler 36 to maintain liquid 26 at the optimum temperature to form the desired prills. This temperature is that which provides a cooling rate for the prills which does not result in the irregular crystallization or thermally induced fractures which would result from a cooling rate which is either too slow or too rapid.

It will be apparent that, while the droplets 27 are being cooled from their molten state to the solid state of the resulting prills 29, the carrier fluid 26 provides a chemically inert environment protecting the phase stabilized ammonium nitrate from exposure to air or other chemically reactive materials.

Second Embodiment

Figure 2:
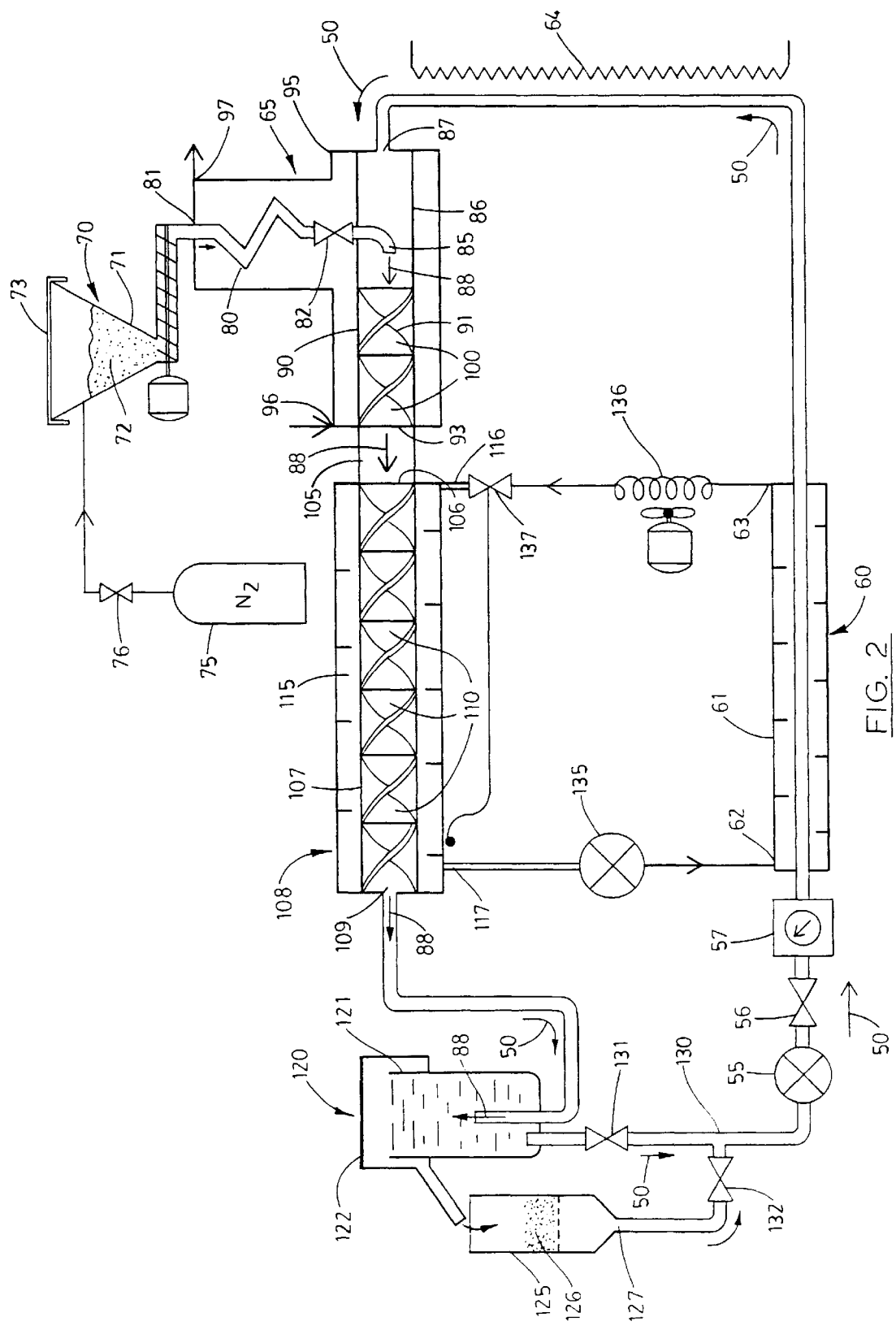
FIG. 2 is a diagram of equipment for practicing a second and continuous method of the present invention.

In FIG. 2 is shown equipment for practicing a second and continuous method of the present invention for prilling by introduction of molten liquid into a carrier liquid.

The equipment is particularly effective for forming small, regular particles of uniform size from the oxidizing salt of ammonia, ammonium dinitramide (ADN) which is extremely sensitive and is highly corrosive to all metals when molten. The equipment is adapted to form prills of stabilized ADN in a selected size in the range of about 50 to 350 um. The apparatus melts a mixture of powdered ADN and stabilizer and then forms the prills by injecting the molten mixture into a chemically inert, heat transfer, carrier liquid which is continuously recirculated within the equipment without significant loss. This liquid is in turbulent flow when the mixture is injected so as to break up the molten mixture into small droplets and to separate them during subsequent cooling and solidification into prills. To prevent supercooling of the droplets without solidification during cooling of the droplets and prills, the liquid is maintained in turbulent flow while being cooled by compression refrigeration. To prevent chemical reaction or contamination of the ADN, the equipment is constructed of chemically inert materials and protects its contents from exposure to the atmosphere or to moisture.

The carrier liquid isolates the ADN material, particularly heated and molten such material, from feed material and from exposure to air, moisture, or other chemically reactive or contaminating materials. Immersion of the ADN material in the inert fluid eliminates fire propagating between droplets or prills and eliminates impacts with prills being formed. The carrier liquid removes the heat of fusion from the droplets so that they solidify into the desired solid spherical prills. The carrier liquid has high thermal conductivity which, together with selection of the carrier liquid temperature during cooling, provides a cooling rate resulting in prills without irregular crystallization or thermally induced fractures caused by either too slow or too rapid a cooling rate. The carrier liquid provides a consistent, all liquid environment surrounding each droplet of molten material as it solidifies resulting in prills without indentations or irregularities. This requires a liquid with a sufficiently high boiling point that it will not change phase or produce gas bubbles on contact with the heated ADN product. Also, the carrier liquid must not become excessively viscous or solidify at the lowest temperature used within the equipment. The carrier liquid supports and forms droplets of the molten material and, and, for flotation separation of the prills, requires a greater density than the solid material. It is essential that the carrier liquid have suitable densities and viscosities for prilling involving highly turbulent flow and that changes in density and viscosity with temperature not affect circulation of the liquid and prill formation and separation. Finally, it is desirable that the carrier liquid be non-toxic.

Liquids that are suitable for prilling by the subject equipment and that generally meet the above criteria are sold under the tradename "Fluorinert" by the 3M Specialty Chemical Division of St. Paul, Minn. These liquids are perfluorinated and are stated to have a viscosity equivalent to water and a thermal expansion eight times that of water.

For prilling ADN in accordance with the present invention, the particular such liquid identified as "FC-75" has been found effective. This particular liquid is believed to contain perfluorinated cyclic ethers and is catalogued as having a typical boiling point of about 102° C. and a pour point of −88° C. This pour point is sometimes referred to herein as "fluid temperature" and is, of course, above the melting temperature of the liquid. ADN has a nominal freezing and melting temperature of about 93° C. and can, as before mentioned, supercool as much as 70° C. between the molten and solid states to a temperature sometimes referred to herein as "supercooling temperature". It is evident that this perfluorinated liquid has a boiling temperature greater than the freezing temperature of ADN, and flows at a fluid temperature which is less than this freezing temperature and less than such a supercooling temperature.

The density of the FC-75 liquid is cataloged as about 1.77 G/cm$^3$ at 25° C., and the density of solid ADN at room temperature is about 1.81 G/cm$^3$. This relative density does not provide flotation separation as shown in FIG. 2, but separation by filtration or centrifugal action are also effective for purposes or the present invention. The density, viscosity, surface tension, and other properties of molten ADN have not been investigated because of the danger of working with this material. It is believed that, due to its relatively great thermal expansion, the FC-75 material is significantly less dense than ADN at temperatures of about 100° C. at which, as described below, a molten ADN mixture is injected into the carrier liquid.

The equipment represented in FIG. 2 has a fluid circuit in which, during prilling, a flow of the carrier liquid is continuously circulated as indicated by arrows 50 with the liquid being at various temperatures above its freezing point and below its boiling point.

The equipment is depicted functionally as having the carrier liquid so circulated by a pump 55 which discharges through a flow control valve 56 and a flow meter 57 so as to selectively vary and measure the flow rate of the carrier liquid for a purpose subsequently explained. As also subsequently explained, the carrier liquid at the pump portion of the circuit is at its lowest temperature in the fluid circuit of about 40° C. and has been substantially separated from ADN; however, residual solid ADN may be present and the pump must be constructed so as not to crush this residual ADN. For this purpose and to combine the functions of the flow motivating and controlling elements 55 through 57, a variable speed, positive displacement, progressing cavity pump having a rotor in an elastomeric sleeve has been found effective. Such pumps are sold by Moyno Industrial Products of Springfield, Ohio.

From the flow motivating and controlling elements 55 through 57 the carrier liquid passes to a regenerative heater 60 where the liquid is preliminarily heated by compressed refrigerant in a jacket 61. The refrigerant enters and exits this jacket at corresponding connections 62 and 63 thereto. The carrier liquid so preheated in heater 60 then passes to an electric resistive heater 64 where it is heated to a temperature of about 100° C. which is thus above the melting temperature of ADN and between the boiling and freezing temperatures of the carrier liquid.

The heated carrier liquid then passes to a melter and injection assembly which is indicated generally by numeral 65 and is constructed as subsequently described for melting ADN and introducing the melted ADN into the carrier fluid.

Assembly 65 is provided with ADN in solid, particulate form by a screw feeder 70 having a hopper 71 in which is placed feed material 72 consisting of pulverized, solid ADN and, typically, hexamine as a decomposition stabilizer. The hopper has a tightly closeable cover 73 and is connected to a source 75 of dry, pressurized nitrogen gas. The flow of this gas to the hopper and resulting pressure therein are controlled by a valve 76 to inject the molten ADN into the carrier fluid. The feeder provides physical isolation between heated materials and feed material 72 to reduce the possibility of any reaction propagating into the feed material and to minimizes the amount of heated material present at any one time.

Melter and injection assembly 65 has a generally vertical melter conduit 80 of heat conductive material. This conduit has an inlet 81 which receives a continuous feed of the particulate ADN and stabilizer from feeder 70 and is of sinuous configuration to increase heat transfer area while passing particulate material. The melter conduit has an outlet connected to a molten material flow control valve 82 through which molten ADN and stabilizer are discharged by nitrogen pressure from source 75 to a nozzle 85 disposed within a cylindrical, horizontal injection conduit 86 of heat conductive material. Conduit 86 has an inlet 87 for the flow of carrier liquid axially of this conduit from heater 64. The nozzle injects the ADN material from valve 82 centrally into and with the flow of carrier liquid so that the ADN material and carrier fluid continue in the above described fluid flow circuit as a combined flow identified by arrows 88.

Assembly 65 has a dispersing conduit 90 which is a continuation of injection conduit 86 and receives combined flow 88 therefrom for encounter with a dispersing device 91 which generates turbulence in the combined flow so as to disperse the molten ADN and stabilizer mixture into droplets in the combined flow. This combined flow with the droplets exits the dispersing conduit and assembly 65 at an outlet 93 thereof.

Assembly 65 has a heating jacket 95 surrounding conduits 80, 86, and 90 and provided with an inlet 96 and an outlet 97 for a any suitable heated fluid at a temperature above the melting temperature of the substance to be prilled. The jacket thus serves, at the conduit 80, to melt this substance from the solid form in which it is delivered from feeder 70 and, at the conduits 86 and 90, to maintain this substance in the molten form.

With ADN and the FC-75 liquid, temperatures in jacket 95 in the range of 100 to 110° C. have been found effective. The temperature of the carrier liquid at it enters the injector assembly is, typically, 0 to 5° C. less than this jacket temperature. At nozzle 85 the temperatures of the carrier liquid and the molten ADN material are about the same. For use in the jacket, one of the above-identified "Fluorinert" liquids sold as "FC-40", which boils at 155° C. and is less expensive than FC-75, has been found effective. However, FC-40, which is cataloged as having a kinematic viscosity of 2.2 cs at 25° C. while the corresponding value for FC-75 is 0.8 cs, was found too viscous at lower temperatures used in the equipment of FIG. 2.

Dispersing device 91 functions with the carrier liquid, which has a density and viscosity selected for this purpose, to generate and promote turbulence of the combined flow 88 at this element so as to form and disperse the before mentioned droplets of molten ADN material in the carrier liquid. The droplet size, which determines the prill size, is a function of the density and viscosity of each component of the combined flow, the interfacial tension and volume fraction of these components, and equipment parameters such as diameter of the conduit 90 and structure of the dispersing device, and fluid velocity in the conduit. The most important parameters for determining droplet size are expressed by the Weber Number which relates inertial forces to interfacial forces while the Reynolds Number, which relates inertial forces to viscous forces, is less important with turbulent flow where the inertial forces dominate. However and as mentioned above, the properties of molten ADN are not well-known, but the flow must be fully turbulent to produce ADN prills in the range of 50 to 350 um. With the structure, materials, and temperatures set forth herein for prilling ADN, an internal diameter of ⅜ inch for a conduit corresponding to conduit 90 and a flow of carrier liquid at a point corresponding to flow meter 57 of about 0.25 to about 1.00 gallons per minute was effective for the production of prills in such range.

With a particular construction of the dispersing conduit 90 and device 91 and a particular carrier liquid and molten material to be prilled, the size of the prills is selectable in accordance with the present invention by varying the flow rate of the carrier liquid at the inlet 87 of injection conduit 86 and thus varying the flow rate of the combined flow and the turbulence which disperses the droplets. It is evident that any suitable flow motivating and control elements, such as elements 55, 56, through 57 or the before mentioned variable speed, positive displacement pump, are effective for this purpose.

For the device 91 which causes the liquid ADN to breakup into droplets, it has been found effective to employ a succession of static mixer elements 100 of the kind disclosed and claimed in U.S. Pat. No. 3,286,992, which issued Nov. 22, 1966, and further described in U.S. Pat. No. 4,014,463. These elements are described as a plurality of helical sheet-like elements extending in series longitudinally within a tube with each element being twisted so that its leading edge is at a substantial angle to its trailing edge. The leading and trailing edges of adjacent elements are at a substantial angle and the elements are alternately right and left handed. To prevent attack by the molten ADN, elements 100 and other elements of the equipment represented in FIG. 2 may be coated with polytetrafluoroethylene material.

From dispersing conduit 90 of heated melter and injection assembly 65, combined flow 88 of carrier liquid and of droplets of molten ADN material passes through a relatively short transition conduit 105 to an inlet 106 of a cooling conduit 107 which is of heat transmissive material and is included in a cooler assembly 108. This assembly cools the combined flow to a temperature below the freezing temperature of the ADN material and above the melting temperature of the carrier liquid so that the droplets solidify into prills of the ADN material flowing in the carrier liquid as a continuation of the combined flow which leaves the assembly at an outlet 109.

Conduits 90, 105, and 107 are substantially continuous so that the turbulence generated in the combined flow by static mixer elements 100 continues in conduit 107 where this turbulence is maintained by a succession of further static mixer elements 110 substantially identical to the elements 100. As shown in FIG. 2, there are several times as many of the elements 110 as of the elements 100. Cooling of the combined flow to form prills occurs during this maintained turbulence with the carrier fluid and this turbulence preventing agglomeration of the droplets or of the prills as the prills form from the droplets.

Assembly 108 has a parallel flow cooling jacket 115 about conduit 107. This jacket has an inlet 116 through which the jacket is provided with refrigerant which, after cooling conduit 107, passes to an outlet 117. As before mentioned, ADN requires the rapid removal of large quantities of heat to insure solidification of prills without supercooling. This rapid cooling is provided by a high heat transfer rate through conduit 107 due to the refrigerant, which is maintained at a temperature of about 50° C. below the temperature of the combined flow at cooler outlet 109, and due to the turbulence maintained in the combined flow by elements 110. This turbulence results in rapid heat transfer from the forming prills to the carrier liquid and from this liquid to the refrigerant, the carrier liquid being selected to have a density and a viscosity resulting in turbulent flow of said carrier fluid in cooler assembly 108 at the lowest temperature of said combined flow therein. As a result, prills form from the ADN material droplets provided to the cooler assembly despite any supercooling which occurs during the turbulent flow in conduit 107 where the ADN material is rapidly cooled to a temperature where the droplets of this material solidify despite any tendency to supercool. For prilling of the hexamine stabilized ADN material using the above-identified FC-75 perfluorinated carrier liquid, a temperature of the combined flow at cooler assembly outlet of about 45° C. has been found effective.

From cooler outlet 109 the combined flow of prills and carrier liquid is directed to any suitable device for separating the prills from the liquid and for providing the main flow of the separated liquid for recycling to pump 55 and then to heater 60. A flotation separator 120 of well-known construction is shown in FIG. 2 for this purpose and is preferred as being appropriate for continuous production of prills. However, with the FC-75 liquid, which is slightly more dense than ADN at temperatures of about 25° C., the prills may be separated by mechanical filtration.

The combined flow enters separator 120 centrally within a cylindrical internal partition 121 of the separator. Prills in the combined flow float over this partition and pass, together with a portion of the carrier liquid from this flow, into a chamber 122 enclosing the top of the partition. The prills and this liquid portion pass gravitationally from the chamber into a filter assembly 125 which retains the prills as indicated by numeral 126 while the liquid passes to an outlet 127. After the prills are removed from the filter assembly, any carrier liquid remaining on the prills may be removed by vacuum distillation.

A conduit 130 conducts the main flow of the carrier fluid from the bottom of separator to pump 55. A valve 131 in this conduit adjusts the flow therein for suitable overflow at partition 121. Conduit 130 also receives carrier liquid from filter assembly outlet 127 by way of a valve 132. Conduit 130 thus serves to recycle to pump 55 the carrier liquid from which prills 126 were separated. It is evident that the liquid so recycled is reheated in heaters 60 and 64 to a temperature above the freezing temperature of the ADN material for introduction of a continued flow of the molten ADN material into the carrier fluid at nozzle 85.

The equipment shown in FIG. 2 includes elements which may be considered as functioning, together with cooler assembly 108 and regenerative heater 60, as a refrigeration system, a regenerative heat transfer system, or a heat pump for minimizing the heating and cooling energy consumption to provide the required temperature variations in the circulating carrier liquid. These elements transfer heat removed from the carrier liquid by turbulent heat transfer in the cooler assembly to the regenerative heater for heating the flow of carrier liquid thereat. For this purpose, cooler jacket 115 functions as the evaporator of a refrigeration system and jacket 61 of the heater functions as a condenser of the refrigerant system.

These elements may be of conventional construction and include a refrigeration compressor 135 connected for compressing refrigerant from cooler jacket outlet 117 and for delivering the refrigerant to regenerative heater jacket inlet location 62. These elements also include a refrigeration condenser 136 which is represented as air cooled. This condenser receives refrigerant from regenerative heater jacket outlet location 63, completes condensation of the refrigerant, and delivers the refrigerant through an expansion valve assembly 137 to cooler jacket inlet 116.

The operation of the described equipment is believed clearly apparent and is briefly summarized at this point. After filling and closing the feeder hopper 71 subsequent operations may be performed by remote control. Power is applied to pump 55 and compressor 135 and heat is applied at heater 64 and jacket 95 until the equipment reaches operating temperature. To maintain the proper flow of molten ADN material, the hopper is pressurized and the speed of feeder 70 and the position of valve 82 are adjusted. The flow of carrier liquid from pump 55 is selected so that mixer elements 100 provide the proper turbulence for generation of the desired sized of prills, and valve 131 is adjusted to provide sufficient overflow in separator 120 for the produced prills 126 of stabilized ammonum ditramide.

Although preferred methods and equipment embodying the principles of the present invention for prilling by introduction of molten salts into a carrier liquid of greater density have been described, it is to be understood that the invention may be practiced within the scope of the following claims other than as specifically set forth herein.

What is claimed is:

1. A method for forming prills of a desired size from an oxidizing salt of ammonia having a freezing temperature and provided as a solid material, the method comprising:

melting the solid material into a melted material;

providing a carrier liquid which is inert to the solid material and to the melted material, has a boiling temperature greater than said freezing temperature, and flows at a fluid temperature less than said freezing temperature;

introducing droplets of the melted material into a quantity of the carrier liquid, said droplets having a size corresponding to said desired size;

cooling said droplets in said quantity of the carrier liquid to a temperature between said freezing temperature and said fluid temperature so that said prills form from said droplets in said carrier liquid; and separating said prills from said carrier liquid.

2. The method of 1 wherein said oxidizing salt of ammonia is selected from the group consisting of ammonium nitrate and ammonium dinitramide.

3. The method of claim 1 wherein:

said solid material has a solid density;

said melted material has a melted density; and said carrier liquid has a density greater than said solid density and greater than said melted density.

4. The method of claim 3 wherein said substance is an oxidizing salt of ammonia and said carrier liquid is a perfluorinated organic compound.

5. The method of claim 3 wherein, in separating said prills from said carrier fluid, said quantity of said carrier liquid and said prills are disposed in a vessel having an fluid surface of said carrier liquid so that said prills separate from said carrier fluid by flotation at said fluid surface.

6. The method of claim 5 wherein:

said vessel has a lower portion;

said quantity of said carrier liquid is maintained in said vessel
 in a generally quiescent condition,
 at a temperature between said freezing temperature and said fluid temperature, and
 with said liquid surface above said lower portion;

said droplets are
 introduced into said lower portion through an orifice,
 float toward said liquid surface, and
 form said prills by heat transfer to said carrier liquid as said droplets float toward said liquid surface; and
 the size of said droplets and the size of said prills is determined by the size of said orifice.

7. The method of claim 6 wherein said substance is an oxidizing salt of ammonia and said carrier liquid is a perfluorinated organic compound.

8. The method of claim 7 wherein said oxidizing salt of ammonia is ammonium nitrate.

9. The method of claim 1 further comprising:

providing said quantity of said carrier liquid as a flow of said carrier liquid at a temperature above said freezing temperature;

introducing a flow of said melted material into said flow of said carrier liquid;

turbulently mixing said flow of said carrier liquid and said flow of said melted material so as to form a combined flow of said droplets of the melted material introduced into said quantity of the carrier liquid, said combined flow being maintained at a temperature above said freezing temperature and the size of said droplets being determined by the turbulence of said combined flow; and cooling said combined flow so as to cool said droplets in said quantity of the carrier liquid to a temperature between said freezing temperature and said fluid temperature so that said prills form from said droplets in said carrier liquid.

10. The method of claim 9 wherein said substance is an oxidizing salt of ammonia and said carrier liquid is a perfluorinated organic compound.

11. The method of claim 10 wherein said oxidizing salt of ammonia is ammonium dinitramide.

12. The method of claim 9 further comprising:

reheating said quantity of said carrier liquid to said temperature above said freezing temperature after separating said prills from said quantity of said carrier fluid; and recycling said quantity of said carrier liquid after said reheating for introduction of a continued flow of said melted material into said quantity of said carrier liquid.

13. The method of claim 9 further comprising selecting the turbulence of said combined flow so as to determine the size of said droplets by controlling the flow rate of said quantity of said carrier liquid during said recycling.

14. The method of claim 9 wherein:

said combined flow is maintained in a turbulent condition following mixing of said flow of said carrier liquid and said flow of said melted material and determination of said size of said droplets; and said cooling of said combined flow to form said prills occurs during said turbulent condition following determination of said size of said droplets.

15. The method of claim 14 wherein said carrier fluid is selected so as to have a viscosity providing turbulent flow at the lowest temperature of said combined flow during said cooling.

16. The method of claim 9 wherein:

said substance is subject to supercooling from the melted state of said material to the solid state of said material; and said cooling of said combined flow lowers said combined flow to a temperature such that any said supercooling occurs during said turbulent condition.

17. The method of claim 9 wherein:

said substance is ammonium dinitramide and subject to supercooling from the melted material to the solid material;

said carrier fluid is a perfluorinated organic compound selected so as to have a viscosity providing turbulent flow a the lowest temperature of said combined flow during said cooling; and said cooling of said combined flow lowers said combined flow to a temperature such that any said supercooling occurs during said turbulent condition.

18. The method of claim 1 wherein said substance is an oxidizing salt of ammonia and a solid, meltable stabilizing substance is incorporated in said prills; and wherein the method further comprises providing said stabilizing substance in said melted material.

19. The method of claim 18 wherein said oxidizing salt of ammonia is ammonium nitrate and said stabilizing substance is zinc diamine sulfate provided in said melted material by melting zinc sulfate together with said ammonium nitrate and by subjecting the melted zinc sulfate and melted ammonium nitrate to ammonia gas before introducing said melted material into said carrier liquid.

20. A method for forming prills of a desired size from an oxidizing salt of ammonia having a freezing temperature and provided as a solid material, the method comprising:

melting the solid material into a melted material;

providing a perfluorinated organic compound which is inert to the solid material and to the melted material, has a boiling temperature greater than said freezing temperature, and flows at a fluid temperature less than said freezing temperature;

introducing droplets of the melted material into a quantity of the perfluorinated organic compound, said droplets having a size corresponding to said desired size;

cooling said droplets in said quantity of the perfluorinated organic compound to a temperature between said freezing temperature and said fluid temperature so that said prills form from said droplets in said perfluorinated organic compound; and separating said prills from said perfluorinated organic compound.

* * * * *